United States Patent [19]

Balasubramanian

[11] Patent Number: 5,787,193
[45] Date of Patent: Jul. 28, 1998

[54] SYSTEM FOR CONVERTING COLOR IMAGE SIGNALS FROM RGB TO CMY COLOR SPACES THROUGH LOOK-UP TABLES

[75] Inventor: Raja Balasubramanian, Webster, N.Y.

[73] Assignee: Xerox Corporation, Stamford, Conn.

[21] Appl. No.: 720,134

[22] Filed: Sep. 27, 1996

[51] Int. Cl.⁶ .................. H04N 1/46; G06K 9/00
[52] U.S. Cl. .................. 382/167; 358/522; 358/523
[58] Field of Search ................ 382/162, 163, 382/167, 168; 358/518, 519, 522, 523, 529, 530, 535

[56] References Cited

U.S. PATENT DOCUMENTS

| | | | |
|---|---|---|---|
| 4,887,150 | 12/1989 | Chiba et al. | 358/80 |
| 4,992,862 | 2/1991 | Gabor | 358/518 |
| 5,077,604 | 12/1991 | Kivolowitz et al. | 358/75 |
| 5,087,126 | 2/1992 | Pochieh | 356/402 |
| 5,187,570 | 2/1993 | Hibi et al. | 358/80 |
| 5,270,808 | 12/1993 | Tanioka | 358/527 |
| 5,293,228 | 3/1994 | Marti | 348/391 |
| 5,412,491 | 5/1995 | Bachar | 358/500 |
| 5,452,017 | 9/1995 | Hickman | 348/646 |
| 5,528,386 | 6/1996 | Rolleston et al. | 358/522 |
| 5,594,558 | 1/1997 | Usami et al. | 358/518 |
| 5,719,956 | 2/1998 | Ogatsu et al. | 358/518 |

*Primary Examiner*—Thomas D. Lee
*Assistant Examiner*—Jerome Grant, II
*Attorney, Agent, or Firm*—R. Hutter

[57] ABSTRACT

A system for converting RGB color signals to CMY or CMYK color signals, such as to operate a color printing apparatus, utilizes three separate electronic look-up tables. Each look-up table allows inputs of RGB signals, which are applied to a three-dimensional space. Each point in the space represents an output for one CMY color signal, and each look-up table is dedicated to one CMY color output. Each look-up table emphasizes one particular RGB color, by providing a higher resolution of inputs along the axis for that color.

7 Claims, 3 Drawing Sheets

SYSTEM FOR CONVERTING COLOR IMAGE SIGNALS FROM RGB TO CMY COLOR SPACES THROUGH LOOK-UP TABLES

The present application incorporates by reference U.S. Pat. No. 5,528,386, issued Jun. 18, 1996, assigned to the assignee hereof.

The present invention relates to a system for converting colorimetric image signals of one type, such as using RGB primary colors, to colorimetric signals of a second type, such as CMY or CMYK.

In the printing of color images based on electronic signal image signals, whether those electronic image signals derive from a hard-copy scanner or are synthesized from an electronic document, it is a well-known necessity to render the calorimetric image signal forming the image in a color space which is suitable for printing. For scanning from a hard-copy original, the original calorimetric signals derived from the hard-copy image are typically in a red-green-blue (RGB) color space; however, most general-purpose color printing apparatus, whether electrostatographic or otherwise, require that the colorimetric signal applied to cyan-magenta-yellow (CMY) or cyan-magenta-yellow-black (CMYK) color space. Most full-color xerographic printers, for example, have supplies of cyan, magenta, yellow, and black toner, different proportions of which are applied to different portions of an image to obtain subtle gradations of color in the visible spectrum.

There exists in the prior art any number of systems and methods for performing the conversion of original RGB-based image signals to CMY or CMYK-based image signals which can be applied directly to a digital printing apparatus. Among these patents in the prior art are U.S. Pat. No. 5,077,604; 5,087,126; and 5,528,386, described in detail below. To one extent or another, each of these prior art systems and methods generally involve applying the original RGB signals to one or another systems of look-up tables by which the RGB signals are converted to CMY or CMYK signals.

Further in the prior art, U.S. Pat. No. 4,887,150 discloses a device for converting RGB image signals first into CMY image signals, and then into CMYK signals.

U.S. Pat. No. 5,187,570 discloses a system for converting color image signals from one type to another, such as RGB to CMY. The system uses linear compression to convert values from one type of color signal to the other.

U.S. Pat. No. 5,270,808 discloses a system for converting RGB signals to a CMYK signal in a digital system. An average value is calculated over plural pixels in the vicinity of an object pixel to be digitized, and plural average values are then obtained by including the object pixel selected at each of the reproducible colors. This operation creates a digitization error, which is corrected by distributing the error to succeeding pixels with weighted ratios.

U.S. Pat. No. 5,293,228 discloses a system for converting RGB to CMY signals, in which a luminance signal is formed by a linear combination of the RGB signal. At least one color signal and the luminance signal are digitized, sampled at the same resolution, and subjected to a reversible mathematical transformation in the frequency domain.

According to the present invention, there is provided an apparatus for converting color signals representing at least a first color and second color of a first type to color signals representing at least a first color and second color of a second type. A first look-up table and a second look-up table are provided, each look-up table being a multi-dimensional look-up table defined in a memory accessible in real time and having as inputs predetermined color signals representing at least the first color and second color of said first type. The first look-up table provides an output for each of a set of combinations of input signals representing the first color and second color of said first type, each output being a color signal representing the first color of said second type. The first look-up table is representative of a multi-dimensional color space wherein each of the first color and second color of the first type relates to an axis in the color space. The second look-up table provides an output for each of a set of combinations of input signals representing the first color and second color of said first type, each output being a color signal representing the second color of said second type. The second look-up table is representative of a multi-dimensional color space wherein each of the first color and second color of the first type relates to an axis in the color space. There exists a different arrangement of inputs along the axis in the first look-up table corresponding to the first color of the first type than along the axis in the second look-up table corresponding to the first color of the first type. Means are provided for applying color signals representing the first color and second color of said first type to the first look-up table and second look-up table.

Figure 4:
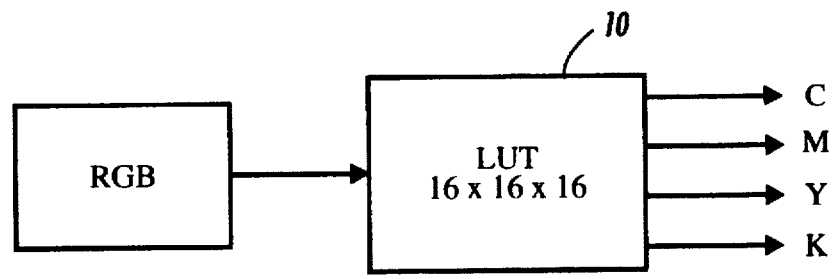
FIG. 4 is a systems diagram of a prior-art three-dimensional look-up table conversion system.

FIG. 4 illustrates a simplified prior-art system by which RGB signals are converted to CMY or CMYK signals. Basically, the raw RGB signals from a digital, hard-copy scanner or computer, are submitted to a three-dimensional look-up table indicated as 10, and from this look-up table the appropriate CMYK signals are output. As is known, a look-up table such as 10 is in the form of electronic memory which can be accessed and caused to produce an output in response to electronic signal inputs in close to real time.

Figure 5:
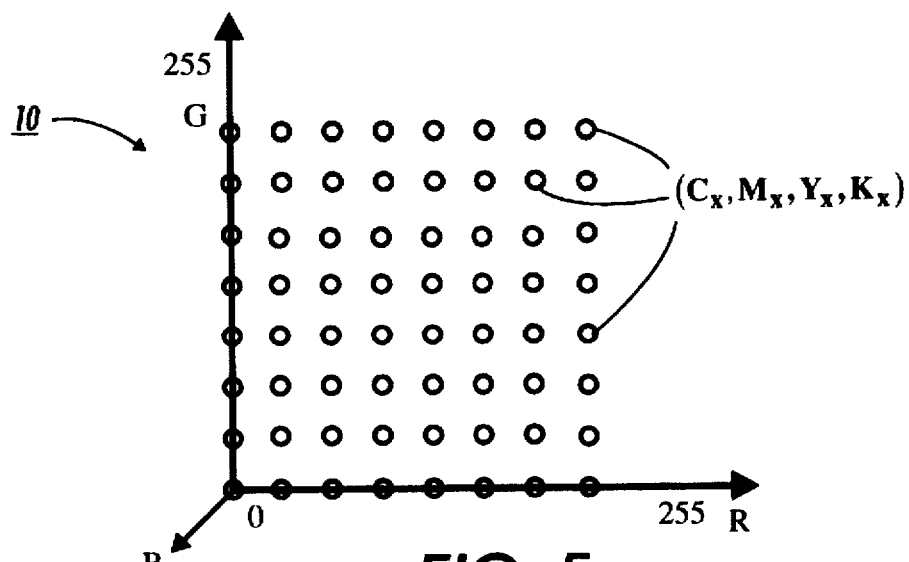
FIG. 5 is an example of the locations of outputs in color space according to the prior-art system shown in FIG. 4.

A detailed conceptual view of the three-dimensional table 10 is shown in FIG. 5. What is shown in FIG. 5 is intended to be one cross-section of a three-dimensional space, in which the axes correspond to the red, green, and blue components of the input calorimetric signals. Starting at the origin, there exists a relatively small amount of a particular color, with that amount of color increasing as one moves from the origin along a particular axis. In this way, every color in the gamut can be expressed as a combination of a red, green, or blue input in color space.

As shown in FIG. 5, there exists a large number of points within the relevant area of color space, with each point approximating a particular color in the visible spectrum. Every possible input to the look-up table 10 will correspond to one such point in the three-dimensional color space. Every single discrete point in the three-dimensional color space is associated with a unique combination of CMYK colorants which most closely approximate the RGB combination for that location. Interpolation techniques can be used to locate and simulate colors which are not precisely placed on a particular point. In order to perform the conversion, in general, each of the original RGB signals is mapped to a unique point in the three-dimensional color space, and then the CMY or CMYK combination associated with that particular spot is read out and applied, for example, to a color xerographic printing apparatus.

As shown in FIG. 5, the axes of the primary RGB colors range in intensity from 0 to 255, as is typical with current-day color image-processing apparatus. Further as shown in the Figure, this 0-to-255 range is divided into eight equal sections along each axis. Although the sections demarcated by the locations in the graph are equally-spaced, it is known in the art to provide systems where the locations corresponding to the output are not regularly spaced along one or another axis.

Although the diagram of FIG. 5 shows a section of color space divided into 8×8×8 distinct locations, it is common, in currently-available apparatus, to provide a three-dimensional look-up table having 16×16×16=4096, or even 32×32×32=32768, distinct entries for a CMYK output. Considering that each entry (that is, each point in the three-dimensional space) will require three or four numbers for the CMY or CMYK output, it is evident that a relatively large amount of memory, which must be accessed relatively quickly, is required for a complete look-up table.

Figure 1:
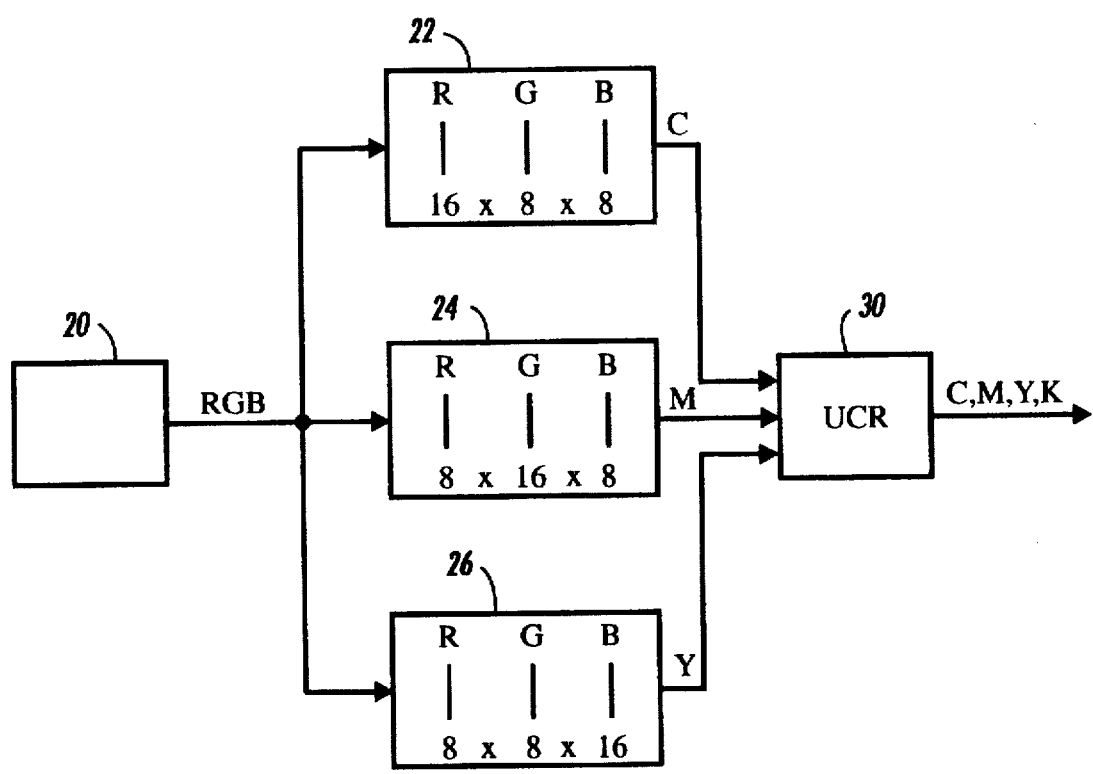
FIG. 1 is a systems view of an arrangement of look-up tables according to the present invention.

FIG. 1 is a simplified diagram showing the look-up table system according to the present invention. An image source 20, which may be, for example, a hard-copy digital scanner, or a personal computer, outputs the same RGB signals to each of three different three-dimensional look-up tables 22, 24, and 26. Each look-up table 22, 24, 26 produces an output in response to a combination of RGB signals applied thereto. According to the present invention, each individual look-up table 22, 24, 26 represents a three-dimensional color space; but, instead of each output in color space representing a full CMYK output, the output is a value of a single CMY primary color; that is, cyan only, magenta only, or yellow only, and not a predetermined combination of three signals. Further as will be noted in FIG. 1, look-up table 22 outputs a cyan signal, look-up table 24 outputs a magenta signal, and look-up table 26 outputs a yellow signal.

It can be seen in FIG. 1 that each individual look-up table represents a three-dimensional color space, but the arrangement of outputs of each look-up table emphasizes one particular RGB primary color. For example, according to the illustrated embodiment, look-up table 22 is a 16×8×8 look-up table with the 16 gradations belonging to the red input signal; look-up table 24 is an 8×16×8 look-up table with the 16 gradations corresponding to the green component of the RGB signal; and look-up table 26 is an 8×8×16 three-dimensional look-up table with 16 gradations along the blue axis. This emphasis on one primary color in each table is expressed by providing more gradations along one axis in the table, thus providing a higher resolution of inputs for that particular color. For instance, along the high-resolution axis, the 256 basic digital color gradations are divided among 16 levels along the high-resolution axis, but only among 8 levels along the other two axes. Because of the higher resolution along a particular axis, less reliance on interpolation techniques, which tend to introduce error, is required to determine outputs corresponding to inputs which do not correspond to the predetermined points in the look-up table.

Figure 2:
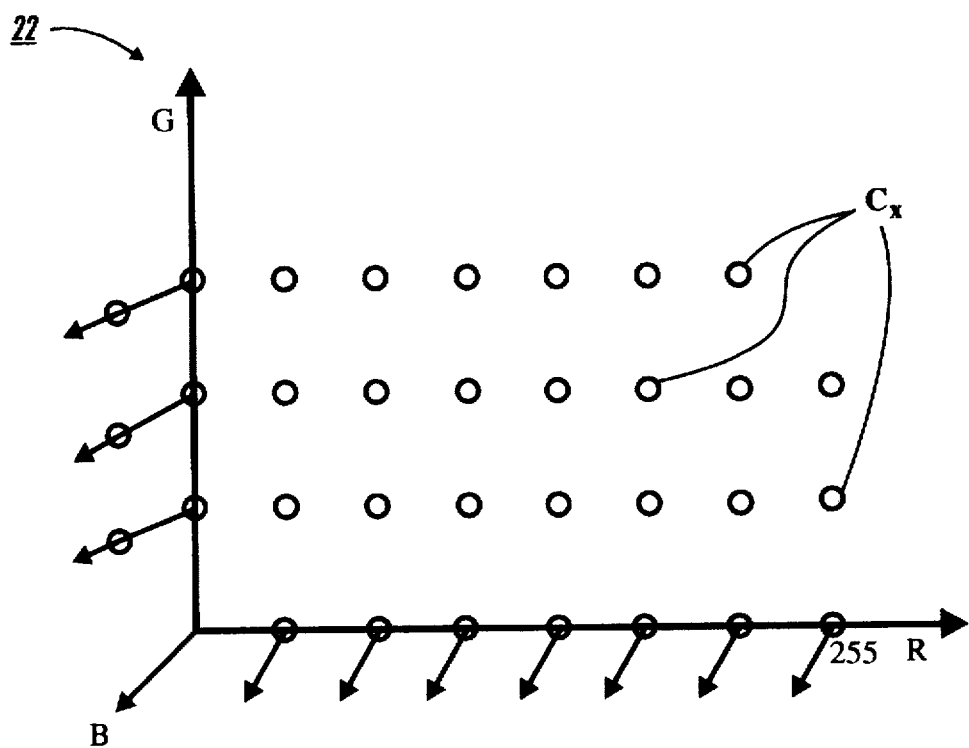
FIG. 2 illustrates, in color space, the location of outputs relative to input variables for a particular look-up table according to the present invention.

FIG. 2 illustrates, in simplified color-space, one look-up table such as 22 according to the present invention. It can be seen that the output, represented by dots in the color space, are distributed with a higher resolution along the R axis, and each dot represents simply a cyan output $C_r$. As illustrated in FIG. 2, there are 8 gradations from 0 to 255 along the R axis, with only 4 gradations along either the B or G axis. (Although an 8×4×4 matrix is shown for clarity, a preferred embodiment for a standard digital printing system is a 16×8×8 color space.)

The arrangement of outputs of look-up table 24 will look generally similar to that of look-up table 22 in FIG. 2, except that the higher resolution (more number of gradations) will be apparent along the green axis, and every output will be a magenta output. With look-up table 26, the higher resolution will appear along the B axis, and every output will be a value of Y.

Returning to FIG. 1, in the illustrated embodiment, the resulting CMY signals can be in turn fed into an "undercolor removal" system, generally indicated as 30, in which, for certain combinations of CMY, a quantity of black K colorant is substituted. Various techniques for this black substitution are known in the art. The CMY or CMYK signals are then sent on to a printing apparatus, such as an electrostatographic or ink-jet printer, where each individual C, M, Y, or K signal is used to operate an appropriate marking device to obtain a desired image. According to an alternate embodiment of the present invention, there may be provided, instead of undercolor removal function 30, a fourth look-up-table (not shown), receptive of one or more RGB signals, arranged in parallel with tables 22, 24, 26, which directly outputs a K signal that complements the CMY signals from the other look-up tables.

The main practical advantages of the system of the present invention, relative to the prior art system, are as follows. First, for a given desired accuracy, each individual look-up table 22, 24, 26 will be relatively smaller, and therefore require less memory and storage, than an equivalent single look-up table. Also, because each point in the color space within each look-up table has only one variable associated therewith, interpolation techniques for finding the value of an output between spots can be simpler.

Figure 3:
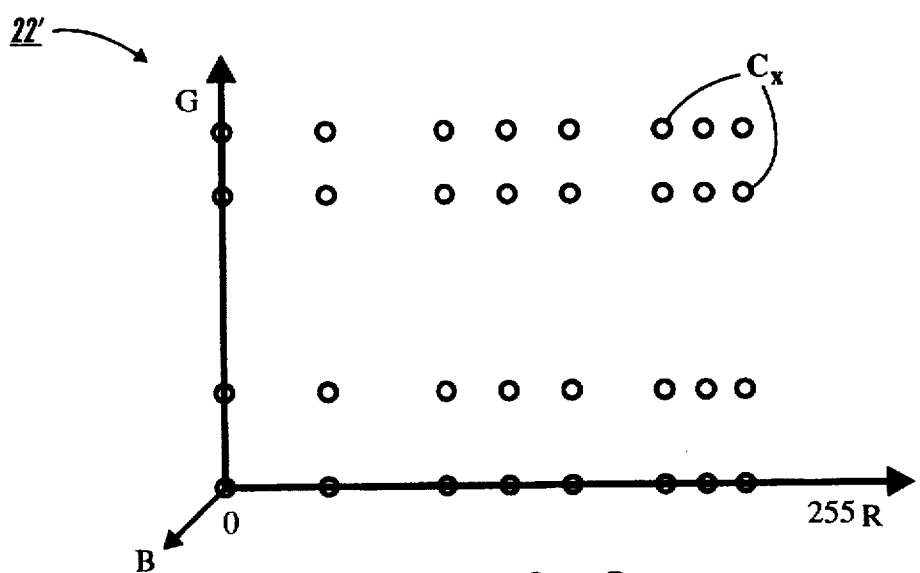
FIG. 3 shows an alternate embodiment of the locations of solutions in color space, according to one embodiment of the present invention.

FIG. 3 shows an alternate example of a look-up table, here indicated as 22', which could be used as an alternative to the look-up table shown in FIG. 2. In the look-up table 22', the locations of the cyan output are not uniformly spaced along either the red or green axes, but rather there is a concentration of resolution of the spots toward the higher end of each scale. This non-uniformity in any axis may be tailored for a particular system, such as to reduce the need for reliance on interpolation along certain portions of a color axis.

In the above description of the invention, an embodiment is shown for converting original RGB color signals to CMY or CMYK signals; however, it will be apparent that the described invention could be adapted in a straightforward manner for converting color signals of any space, such as RGB, CMY, Ycc, L*a*b*, or xyz, to any other space. Further, although the embodiment described in detail is directed to converting signals from one three-dimensional space to another three-dimensional space, it is possible to adapt the invention to convert signals of any number of dimensions to other color spaces having the same, more, or fewer dimensions, e.g. converting three-dimensional RGB signals to seven-dimensional RGBCMYK signals, as may be used, for example, in a "hi-fi" color printing system.

As used in the claims hereinbelow, there exists "a different arrangement" of inputs along an axis in color space corresponding to one color in each look-up table, as compared to the other axes in color space in the look-up table; by this phrase is meant the inputs can be spaced at higher resolution along one axis, spaced with a different non-uniform arrangement along the axis relative to the inputs along the other axes, and/or arranged in some other way different from the other axes.

While the invention has been described with reference to the structure disclosed, it is not confined to the details set forth, but is intended to cover such modifications or changes as may come within the scope of the following claims.

I claim:

1. An apparatus for converting color signals representing at least a first color and second color of a first type to color signals representing at lease a first color and second color of a second type, comprising:

a first look-up table and a second look-up table, each look-up table being a multi-dimensional look-up table defined in a memory accessible in real time and having as inputs predetermined color signals representing at least the first color and second color of said first type;

the first look-up table providing an output for each of a set of combinations of inputs signals representing the first color and second color of said first type, each output being a color signal representing the color of said second type, the first look-up table being representative of a multi-dimensional color space wherein each of the first color and second color of the first type relates to an axis in the color space;

the second look-up table providing an output for each of a set of combinations of input signals representing the first color and second color of said first type, each output being a color signal representing the second color of said second type, the second look-up table being representative of a multi-dimensional color space wherein each of the first color and second color of the first type relates to an axis in the color space;

wherein there exists a different arrangement of inputs along the axis in the first look-up table corresponding to the first color of the first type than along the axis in the second look-up table corresponding to the first color of the first type, the outputs of the first look-up table having a higher resolution along the axis corresponding to the first color of the first type than the outputs of the second look-up table corresponding to the first color of the first type; and means for applying color signals representing the first color and second color of said first type to the first look-up table and second look-up table.

2. The apparatus of claim 1, wherein the color signals representing a first color and second color of a second type relate to CMY colors.

3. The apparatus of claim 1, further comprising means for applying color signals representing the first color and second color of said second type to a digital printing apparatus.

4. The apparatus of claim 1, further comprising means for performing undercolor removal on the color signals representing the first color and second color of said second type.

5. An apparatus for converting color signals representing at least a first color and second color of a first type to color signals representing at least a first color and second color of a second type, comprising:

a first look-up table and a second look-up table being a multi-dimensional look-up table defined in a memory accessible in real time and having as inputs predetermined color signals representing at least the first color second color of said first type;

the first look-up table providing and output for each of a set of combinations of input signals representing the first color and second color of said first type, each output being a color signal representing the first color of said second type, the first look-up table being representative of a multi-dimensional color space wherein each of the first color and second color of the first type relates to an axis in the color space;

the second look-up table providing an output for each of a set of combinations of input signals representing the first color and second color of said first type, each output being a color signal representing the second color of said second type, the second look-up table being representative of a multi-dimensional color space wherein each of the first color and second color of the first type relates to an axis in the color space;

wherein there exists a different arrangement of inputs along the axis in the first look-up table corresponding to the first color of the first type than along the axis in the second look-up table corresponding to the first color of the first type;

the outputs of the first look-up table being non-uniformly distributed along at least one axis in the color space; and means for applying color signals representing the first color and second color of said first type to the first look-up table and second look-up table.

6. An apparatus for converting color signals representing at least a first color and second color of a first type to color signals representing at least a first color and second color of a second type, comprising:

a first look-up table and a second look-up table, each look-up table being a multi-dimensional look-up table defined in a memory accessible in real time and having as inputs predetermined color signals representing at least the first color and second color of said first type;

the first look-up table providing an output for each of a set of combinations of input signals representing the first color and second color of said first type, each output being a color signal representing the first color of said second type, the first look-up table being representative of a multi-dimensional color space wherein each of the first color and second color of the first type relates to an axis in the color space;

the second look-up table providing an output for each of a set of combinations of input signals representing the first color and second color of said first type, each output being a color signal representing the second color of said second type, the second look-up table being representative of a multi-dimensional color space wherein each of the first color and second color of the first type relates to an axis in the color space;

wherein there exists a different arrangement of inputs along the axis in the first look-up table corresponding to the first color of the first type than along the axis in the second look-up table corresponding to the first color of the first type;

wherein there exists a different arrangement of inputs in the first look-up table along the axis corresponding to the first color of the first type than along the axis corresponding to the second color of the first type; and means for applying color signals representing the first color and second color of said first type to the first look-up table and second look-up table.

7. An apparatus for converting color signals representing at least a first color and second of a first type color signals representing at least a first color and second color of a second type, comprising:

a first look-up table and a second look-up table, each look-up table being a multi-dimensional look-up table defined in a memory accessible in real time and having as inputs predetermined color signals representing at least the first color and second color of said first type;

the first look-up table providing and output for each of a set of combinations of the input signals representing the first color and second color of said first type, each output being a color signal representing the first color of said first type, the first look-up table being representative of a multi-dimensional color space wherein each of the first color and second color of the first type relates to an axis in the color space;

the second look-up table providing an output for each of a set of combinations of input signals representing the first color and second color of said first type, each output being a color signal representing the second color of said second type, the second look-up table being representative of a multi-dimensional color space wherein each of the first color and second color of the first type relates to an axis in the color space;

wherein there exists a different arrangement of inputs along the axis in the first look-up table corresponding to the first color of the first type than along the axis in the second look-up table corresponding to the first color of the first type;

wherein there exists a different arrangement of inputs in the first look-up table alone the axis corresponding to the first color of the first type than along the axis corresponding to the second color of the first type, the outputs of the first look-up table having a higher resolution along the axis corresponding to the first color of the first type than along the axis corresponding to the second color of the first type; and means for applying color signals representing the first color and second color of said first type to the first look-up table and second look-up table.

* * * * *